United States Patent [19]
Johnson

[11] Patent Number: 5,881,143
[45] Date of Patent: Mar. 9, 1999

[54] TELEPHONE LINE DEVICE

[75] Inventor: Harold Wayne Johnson, Lenexa, Kans.

[73] Assignee: Sprint Communications Co. L.P., K.C., Mo.

[21] Appl. No.: 695,463

[22] Filed: Aug. 12, 1996

[51] Int. Cl.[6] ............................ H04M 13/00; H04M 1/00
[52] U.S. Cl. ............................ 379/177; 379/158; 379/67
[58] Field of Search ..................................... 379/156, 159, 379/160, 164, 165, 167, 171, 172, 173, 177, 182, 67, 179, 183, 187, 157, 373, 158, 202

[56] References Cited

U.S. PATENT DOCUMENTS

| 4,584,434 | 4/1986 | Hashimoto | 379/93 |
|---|---|---|---|
| 4,660,218 | 4/1987 | Hashimoto | 379/93 |
| 4,706,244 | 11/1987 | Watson et al. | 379/160 |
| 4,805,210 | 2/1989 | Griffith, Jr. | 379/195 |
| 4,998,275 | 3/1991 | Braubstein et al. | 379/164 |
| 5,003,581 | 3/1991 | Pittard | 379/161 |
| 5,062,133 | 10/1991 | Melrose | 379/102 |
| 5,090,052 | 2/1992 | Nakajima et al. | 379/172 |
| 5,151,972 | 9/1992 | Lorenz et al. | 379/93 |
| 5,187,736 | 2/1993 | Moriizumi | 379/100 |
| 5,475,747 | 12/1995 | Bales et al. | 379/201 |
| 5,530,951 | 6/1996 | Argintar | 379/67 |
| 5,590,185 | 12/1996 | Sandler et al. | 379/163 |
| 5,596,631 | 1/1997 | Chen | 379/177 |

Primary Examiner—Paul Loomis
Assistant Examiner—Rexford N Barnie
Attorney, Agent, or Firm—Harley R. Ball; B. Colt McClelund

[57] ABSTRACT

A programmable telephone line device (10) for selectively interconnecting two or more telephone lines between a plurality of communication instruments is disclosed. The device (10) includes an assignment matrix (24) for interconnecting the telephone lines with the communication instruments and a control assembly (26) for automatically or manually directing the assignment matrix (24) to transfer a communication instrument from its primary telephone line to a roll-over telephone line if its primary telephone line is in use.

2 Claims, 1 Drawing Sheet

TELEPHONE LINE DEVICE

BACKGROUND OF THE INVENTION

1. Field of the Invention

The present invention relates to telephone line devices, and more particularly, to a programmable customer premises device for selectively assigning two or more incoming telephone lines between a plurality of communications instruments at a telephone customer's home or business.

2. Description of the Prior Art

Many telephone customers have several telephone lines for providing phone service to a plurality of different communication instruments. For example, it is common for residential telephone customers to have one telephone line for their main telephone or telephones, a second telephone line for their childrens' telephones, a third telephone line for their family computers and facsimile machines, and a fourth telephone line for their home office computer equipment. Moreover, the number of telephone lines subscribed to by customers is expected to increase in the future.

Currently, telephone customers who have a plurality of different communication instruments must either: (1) use only one communication instrument at a time, (2) subscribe to separate telephone lines for each communication instrument, or (3) purchase expensive multi-line telephones that can interconnect between more than one telephone line. None of these options is desirable. The first is inconvenient and the second and third are often too expensive, especially for residential telephone customers.

Sophisticated programmable connection devices are not affordable to many users and are not suitable for residential use. Some examples of these sophisticated devices are PBX systems and automatic call distribution (ACD) systems. Typically, PBX and ACD systems make connections based on telephone numbers. Clearly they are quite expensive and are not suited to residential use. Another example of such sophisticated equipment are digital cross-connect systems (DCS). Clearly, DCS systems are not affordable or suitable to residential users.

Accordingly, there is a need for an improved customer telephone line device for coupling a plurality of telephone lines with a plurality of communication instruments. More particularly, there is a need for such a device that permits a telephone customer to use more than one communication instrument at a time without subscribing to a separate telephone line for each communication instrument and without purchasing expensive multi-line telephones.

SUMMARY OF THE INVENTION

The present invention provides an improved customer telephone line device that overcomes the limitations described above. More particularly, the present invention provides a telephone line device that permits a telephone customer to use more than one communication instrument at a time without subscribing to a telephone line for each communication instrument and without purchasing expensive multi-line telephones.

In the preferred embodiment, the invention is a communications device for selectively interconnecting a plurality of residential telephone lines to a plurality of communications instruments in a residence. The device is under the programming control of the resident. The device comprises a plurality of residential telephone line ports and communications instrument ports. The device further comprises an assignment matrix that is operational to interconnect the telephone line ports with the communications instrument ports in response to control instructions. The invention further comprises a processor that is operational to be programmed by the resident to provide control instructions to the assignment matrix to implement the assignments of selected communications instrument ports to selected telephone line ports.

In other embodiments, the processor is also operational to be programmed by the resident to provide control instructions to the assignment matrix to implement assignments of selected communications instrument ports to selected roll-over telephone line ports. The roll-over telephone line ports are used if the primary telephone line ports are in use.

In other embodiments the device further comprises a signal detector that is operational to detect signals from a communications instrument that is under control of the resident and to provide data representative of the signals to the processor. As a result, the communications instrument can be used by the resident to program the device. For example, a resident could program the device by pressing the keys of a telephone in their home.

BRIEF DESCRIPTION OF THE DRAWING FIGURE

The drawing figure is a block diagram of a customer telephone line device constructed in accordance with a preferred embodiment of the present invention.

DETAILED DESCRIPTION OF THE PREFERRED EMBODIMENTS

HARDWARE

Figure 1:
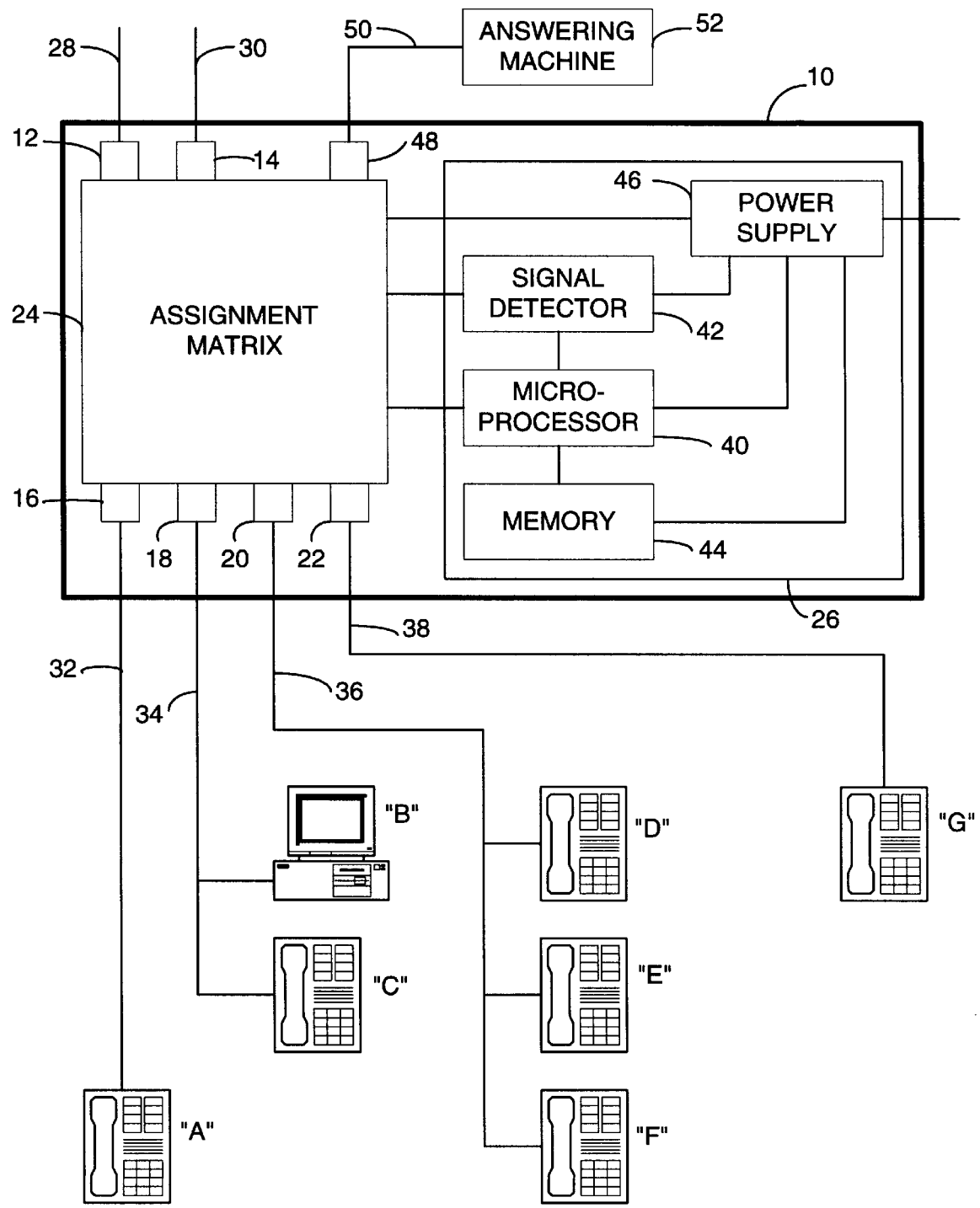

The preferred telephone line device 10 broadly includes at least two telephone line ports 12 and 14; a plurality of communications instrument ports 16, 18, 20, 22; an assignment matrix 24 for interconnecting the line ports 12 and 14 between the communications instrument ports 16, 18, 20, and 22; and a control assembly 26 for controlling the operation of the assignment matrix 24.

In more detail, the telephone line ports 12 and 14 are provided for coupling the assignment matrix 24 with a plurality of incoming telephone lines 28 and 30 provided by a telephone service provider. Those skilled in the art will appreciate that the customer telephone line device 10 may be equipped with any number of telephone line ports for coupling the assignment matrix 24 with any desired number of telephone lines. For example, the illustrated embodiment of the customer telephone line device 10 includes two telephone line ports 12 and 14 for coupling the assignment matrix 24 with two separate telephone lines 28 and 30.

The communications instrument ports 16, 18, 20, and 22 are provided for coupling the assignment matrix 24 with a plurality of connections 32, 34, 36, and 38 that are coupled with a plurality of communication instruments such as telephones, computers, and fax machines. The customer telephone line device 10 may be equipped with any number of communications instrument ports for coupling with any number of communication instruments. For example, the illustrated embodiment of the customer telephone line device 10 includes four communications instrument ports; with communications instrument port 16 being coupled with telephone station "A" by connection 32; communications instrument port 18 being coupled with computer station "B" and telephone station "C" by connection 34; communications instrument port 20 being coupled with telephone stations "D", "E", and "F" by connection 36, and communications instrument port 22 being coupled with telephone station "G" by connection 38.

The assignment matrix 24 is operable for interconnecting the line ports 12 and 14 between the communications instrument ports 16, 18, 20, and 22. As described in more detail below, the control assembly 26 controls the assignment matrix 24 so that it connects each communication instrument to a selected primary telephone line, and in some embodiments, it also connects each communication instrument to a selected roll-over telephone line when its primary telephone line is in use.

The control assembly 26 includes a microprocessor 40, a signal detector 42, a memory 44, and a power supply 46. The microprocessor 40 is conventional and is coupled with the assignment matrix 24 for controlling the interconnecting operation of the assignment matrix 24. The microprocessor 40 runs a program described below.

The signal detector 42 is coupled between the assignment matrix 24 and the microprocessor 40. The signal detector 42 is operable for converting dual tone multi-frequency tones (DTMF) into digital code for use in programming the microprocessor 40. The signal detector 42 is also operable for detecting line conditions such as: ringing, telephone line in use, answer, off-hook, and on-hook. The signal detector 42 is operable to provide line condition status to microprocessor 40.

The memory 44 is coupled with the microprocessor 40 for storing program instructions for operating the microprocessor 40. The preferred memory 44 is a conventional RAM memory chip.

The power supply 46 is conventional and supplies power to the other components of the control assembly 26. The power supply 46 preferably includes a rectifier so that it can be coupled with an AC power source.

In one embodiment, the invention is embodied in a small box that could be readily installed at the demarcation point of the incoming telephone lines. In another embodiment, the invention is embodied in a personal computer card. In another embodiment, the invention is embodied in an answering machine. Those skilled in the art will appreciate various other physical embodiments of the present invention.

The present invention is suitable for use in a residential setting. Examples of residential settings would be homes, condominiums, and apartments where people reside. In these residential embodiments, the resident would use the invention to interconnect various communications instruments in the residence, such as telephones and computers, to the various residential telephone lines that enter the residence. Advantageously, the design of the invention allows it to be provided to residential users in an affordable package. Many programmable connection systems, such as PBX, ACD, or DCS systems, are not affordable to residential users and are not suitable for residential use.

PROGRAMMING

The microprocessor 40 can be programmed to: assign each communications instrument port 16–22 to both a primary telephone line port and a roll-over telephone line port, automatically or manually transfer a communication instrument to its roll-over line port when its primary line port is in use, conference several of the communication instruments together, and transfer the telephone lines to an answering machine when a call is unanswered after a pre-determined number of rings. Each of these features is described separately below.

The microprocessor 40 may be programmed in various ways. For example, in one embodiment of the invention, the assignment matrix 24 may include push-buttons adjacent each of the incoming telephone line ports 12 and 14 as well as push-buttons adjacent each of the communications instrument ports 16, 18, 20 and 22. To assign the communications instrument ports 16, 18, 20 and 22 to the line ports 12 and 14, a push-button adjacent one of the line ports is depressed first and then the push-buttons adjacent the communications instrument ports which the user wishes to connect to the line port are pushed next.

In another embodiment of the invention, the assignment matrix 24 or control assembly 26 may include an alphanumeric keypad or similar device. The control assembly 26 can then be configured for receiving instructions from this keypad so that software instructions can be programmed directly into the microprocessor 40. In another embodiment of the invention, the assignment matrix 24 and control assembly 26 could be implemented with a personal computer card. The card could then be programmed by the personal computer.

In another embodiment of the invention, the microprocessor 40 is programmed by first removing the handset of any telephone such as station "A" to its off hook position and then entering alphanumeric instructions into its keypad. The various buttons on the telephone keypad correspond to various programming commands and various ports. The sequence of input could be used along with the codes to distinguish between the commands. The user would typically be provided with written instructions to follow when programming in this manner. The assignment matrix 24 receives the entered software instructions and provides a bridged connection to the signal detector 42. The signal detector 42 converts the tones from telephone station "A" to digital codes for processing by the microprocessor 40. The program instructions are stored in the memory 44.

Primary and Roll-over Port Assignment

In the push-button mode, if the user wishes to assign communications instrument ports 18 and 22 to line port 12, the user first depresses the push-button adjacent line port 12 and then depresses the push-buttons adjacent communications instrument ports 18 and 22. The remaining communications instruments ports are assigned in a similar manner.

In the telephone keypad input mode, an alphanumeric code such as could be entered into telephone station "A" to signal the microprocessor 40 that it is about to receive a new program command. Various assignment commands and ports would then be entered by the user. Each of the telephone line ports and communications instrument ports would be designated by a code. Various commands would also have a code/sequence designation. Some examples of such commands would be primary port assignment, roll-over port assignment, and answering machine assignment.

The microprocessor 40 may also be programmed to permit the user to invoke a manual roll-over rather than an automatic roll-over. For example, if telephone station "A" is assigned to telephone line port 12, but telephone line 28 is in use, the user can enter a software instruction such as "*#*" into the keypad of telephone A to initiate a roll-over to telephone line port 14 and telephone line 30.

Conference Communication Instruments

The microprocessor 40 may also be programmed to conference several of the communication instruments together. For example, if telephone station "G" is currently making a call over telephone line port 12, a user can conference into the call with any other communication instrument by entering a program sequence into the communication instrument such as "*2*".

Transfer to Answering Machine

As illustrated in the drawing figures, the customer telephone line device 10 may also include a communications instrument port 48 for coupling the assignment matrix 24 with a connection 50 to an answering machine 52. The microprocessor 40 may then be programmed for interconnecting the line ports 12 and 14 to the answering machine 52 if the pertinent communications instruments connected to ports 16–22 are not answered after a pre-determined number of rings.

OPERATION

The operation described below assumes that the user has programmed the following. Telephone line port 12 has been assigned to communications instrument ports 18 and 22 as the primary, and telephone line port 14 has been assigned to communications instrument ports 18 and 22 as the automatic roll over.

Incoming Call

Based on the user's programming, the microprocessor 40 has controlled the assignment matrix 24 to connect line port 12 to primary communications instrument ports 18 and 22. If telephone line 28 receives an incoming call, ringing voltage is present on telephone line port 12 of the assignment matrix 24. The ringing voltage from the incoming call on line port 12 passes through the assignment matrix 24 to communications instrument ports 18 and 22 and subsequently to connections 34 and 38. Any communication instrument connected to either connection 34 or 38 rings and can then be moved to its off hook position to answer the call.

Once the call is answered, the off hook condition is transferred through the connection 34 or 38 to communications instrument port 18 or 22 and then to telephone line port 12 through the assignment matrix 24. Telephone line port 12 transfers the off hook condition through telephone line 28 to a telephone service provider to establish a telephone connection.

Once the user completes the call, the user places the communication instrument back in its on hook position. The on hook condition is relayed through the connection 34 or 38 to communications instrument port 18 or 22 and to the assignment matrix 24. The assignment matrix 24 passes the on hook condition to telephone line port 12 which transfers the on hook condition through telephone line 28 to the telephone service provider which releases the telephone connection.

Outgoing Call

To place an outgoing call on any of the communication instruments, a user places the communication instrument in its off hook condition. The microprocessor 40 has controlled the assignment matrix 24 to connect the associated communications instrument port to the primary telephone line port. For example, when Station "B" goes off-hook, port 18 is connected to port 12 for communications over telephone line 28.

Automatic Roll-over

If the communication instrument's primary telephone line is in use, then the assignment matrix 24 automatically rolls the communication instrument over to its pre-assigned roll-over telephone line. Once the call has been completed, the microprocessor 40 and the assignment matrix 24 automatically transfer the communication instrument back to its primary telephone line. For example, if telephone line 28 is in use when station "B" goes off-hook, then the assignment matrix 24 is controlled to connect communications instrument port 18 to roll-over port 14 for communications over telephone line 30.

Manual Roll-over

If desired, the user of the communication instrument may invoke a manual roll-over by enter the program sequence "*#*" when its primary telephone line is in use.

Answering Machine

If the microprocessor is programmed with an answering machine assignment, the assignment matrix 24 will connect either of the telephone line ports 12 or 14 to the answering machine port 48 after a pre-selected number of rings. As a result, the unanswered call is connected over connection 50 and can be handled by the answering machine 52. This allows multiple communications instruments to share the same answering machine 52.

Conference Call

While a call is in progress, a user of any of the other communication instruments can conference into the call by taking the communication instrument off hook and entering the program sequence "*1*" into the communication instrument handset.

Although the invention has been described with reference to the preferred embodiment illustrated in the attached drawing figure, it is noted that equivalents may be employed and substitutions made herein without departing from the scope of the invention as recited in the claims. Having thus described the preferred embodiment of the invention, what is claimed as new and desired to be protected by Letters Patent includes the following:

I claim:

1. A telecommunications device for selectively interconnecting a plurality of residential telephone lines to a plurality of communications instruments in a residence under programming control of a user, the device comprising:

a plurality of residential telephone line ports that are each operational for connection to one of the residential telephone lines;

a plurality of communications instrument ports that are each operational for connection to at least one of the communications instruments in the residence;

an assignment matrix that is coupled to the telephone line ports and the communications instrument ports, and that is operational to interconnect the telephone line ports with the communications instrument ports in response to control instructions;

a processor that is coupled to the assignment matrix and that is operational to be programmed by the user to provide the control instructions to the assignment matrix to implement assignments of selected communications instrument ports to selected telephone line ports and wherein the processor is operational to be programmed by the user with the signals from the communications instrument that is under the control of the user and wherein the processor is operational to be programmed by the user during a call to provide the control instructions to the assignment matrix to implement assignments of multiple selected communications instrument ports to a single selected telephone line port to facilitate a conference; and a signal detector that is coupled to the assignment matrix and the processor and that is operational to detect signals from a communications instrument that is under control of the user and to provide data representative of the signals to the processor.

2. A telecommunications device for selectively interconnecting a plurality of telephone lines to a plurality of communications instruments under programming control of a user, wherein at least one of the communications instruments is a telephone, the device comprising:

a plurality of telephone line ports that are each operational for connection to one of the telephone lines;

a plurality of communications instrument ports that are each operational for connection to at least one of the communications instruments;

an assignment matrix that is coupled to the telephone line ports and the communications instrument ports, and that is operational to interconnect the telephone line ports with the communications instrument ports in response to control instructions;

a processor that is coupled to the assignment matrix and that is operational to be programmed by the user using a keypad on the telephone and wherein the processor is operational to be programmed by the user to provide the control instructions to the assignment matrix to implement assignments of selected communications instrument ports to selected telephone line ports and wherein the processor is operational to be programmed by the user during a call to provide the control instructions to the assignment matrix to implement assignments of multiple selected communications instrument ports to a single selected telephone line port to facilitate a conference; and a signal detector that is coupled to the assignment matrix and the processor and that is operational to detect signals from the telephone and to provide data representative of the signals to the processor.

* * * * *